US010463220B2

(12) United States Patent
Jee et al.

(10) Patent No.: US 10,463,220 B2
(45) Date of Patent: Nov. 5, 2019

(54) ROBOT CLEANER AND CONTROL METHOD THEREOF

(71) Applicant: Samsung Electronics Co., Ltd, Gyeonggi-do (KR)

(72) Inventors: Yong-keun Jee, Suwon-si (KR); Hyeong-hwan Choi, Suwon-si (KR); Min-ji Kim, Incheon (KR); Jong-soon Kim, Hwaseong-si (KR); Hyeong-jun Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 132 days.

(21) Appl. No.: 15/841,926

(22) Filed: Dec. 14, 2017

(65) Prior Publication Data

US 2018/0168414 A1 Jun. 21, 2018

(30) Foreign Application Priority Data

Dec. 15, 2016 (KR) .................... 10-2016-0171701

(51) Int. Cl.
*A47L 9/28* (2006.01)
*G05D 1/02* (2006.01)

(52) U.S. Cl.
CPC ........... *A47L 9/2894* (2013.01); *A47L 9/2826* (2013.01); *A47L 9/2852* (2013.01); *G05D 1/0212* (2013.01); *G05D 1/0238* (2013.01); *G05D 1/0242* (2013.01); *A47L 2201/04* (2013.01);
(Continued)

(58) Field of Classification Search
CPC .... A47L 9/2894; A47L 9/2826; A47L 9/2852; A47L 2201/04; A47L 2201/06; A47L 9/2842; A47L 9/2857; A47L 2201/00; A47L 9/2889; A47L 9/2805; G05D 1/0212; G05D 1/0238; G05D 1/0242; G05D 2201/0215
See application file for complete search history.

(56) References Cited

U.S. PATENT DOCUMENTS

2016/0100733 A1* 4/2016 Kim ..................... A61L 9/00
15/319

FOREIGN PATENT DOCUMENTS

| DE | 102010000573 A1 | 9/2011 |
| DE | 102011053975 A1 | 4/2012 |
| KR | 100728227 B1 | 6/2007 |

(Continued)

OTHER PUBLICATIONS

European Patent Office, "European Search Report" Application No. EP 17205870.3, May 23, 2018, 5 pages.

*Primary Examiner* — Robert J Scruggs

(57) ABSTRACT

A robot cleaner is disclosed. The robot cleaner includes an infrared sensor including a light emitting device configured to output an infrared ray to a floor and a light receiving device configured to receive the infrared ray reflected from the floor and convert the received infrared ray into an electric signal and output the electric signal; and a processor configured to determine an output voltage of the electrical signal if the electrical signal is received from the infrared sensor, control a travel direction of the robot cleaner based on the output voltage and a predetermined first threshold voltage, and control a suction mode of the robot cleaner based on the output voltage and a predetermined second threshold voltage, wherein the second threshold voltage is higher than the first threshold voltage.

20 Claims, 6 Drawing Sheets

(52) U.S. Cl.
CPC .. *A47L 2201/06* (2013.01); *G05D 2201/0215* (2013.01)

(56) References Cited

FOREIGN PATENT DOCUMENTS

| | | |
|---|---|---|
| KR | 20090019480 A | 2/2009 |
| KR | 101156282 B1 | 6/2012 |
| KR | 101229106 B1 | 2/2013 |
| KR | 101495866 B1 | 2/2015 |

\* cited by examiner

ROBOT CLEANER AND CONTROL METHOD THEREOF

CROSS-REFERENCE TO RELATED APPLICATIONS

This application is related to and claims priority to Korean Patent Application No. 10-2016-0171701 filed on Dec. 152016, the disclosure of which is incorporated herein by reference in its entirety.

TECHNICAL FIELD

Apparatuses and methods consistent with the present disclosure relate to a robot cleaner and a control method thereof, and more particularly, to a robot cleaner and a control method thereof for automatically controlling a travel direction and a suction force of the robot cleaner.

BACKGROUND

Generally, robots are developed for industrial use and widely used in various industrial fields. In recent years, the field of using robots has been expanded to be utilized not only in a medical field, an aerospace field, but also in ordinary households.

A typical example of a robot used at home is a robot cleaner. The robot cleaner performs a function of cleaning an inner space of house by suction impurities such as dust while traveling for itself.

On the other hand, upon performing cleaning, when the robot cleaner reaches a low floor which is lower than an on-going flat ground, such as a living room floor or a cliff, the robot cleaner should change a travel direction to prevent damage due to falling. This is operated by various sensors mounted on the robot cleaner, for example, an infrared sensor and a processor that controls an operation according to a signal received from the sensor.

However, the conventional robot cleaner only uses the infrared sensor to change the travel direction of the robot cleaner and failed to automatically control a suction force according to a type of a floor located below the robot cleaner in operation, such as a hard floor such as a marble, etc. and a soft floor such as a carpet.

Therefore, when the robot cleaner travels on the soft floor in a state in which the robot cleaner operates in a suction mode suitable for the hard floor, there was a problem that cleaning is not properly performed due to low suction force. On the contrary, when the robot cleaner is driven in a state in which the robot clear operates in a suction mode suitable for the soft floor, there was a problem of battery consumption due to the operation a strong suction force even on the hard floor.

SUMMARY

To address the above-discussed deficiencies, it is a primary object to provide a robot cleaner capable of automatically controlling a travel direction and a suction force of the robot cleaner using an infrared sensor and a control method thereof.

According to an aspect of the present disclosure, a robot cleaner may include an infrared sensor including a light emitting device configured to output an infrared ray to a floor and a light receiving device configured to receive the infrared ray reflected from the floor and convert the received infrared ray into an electric signal and output the electric signal; and a processor configured to determine an output voltage of the electrical signal if the electrical signal is received from the infrared sensor, control a travel direction of the robot cleaner based on the output voltage and a predetermined first threshold voltage, and control a suction mode of the robot cleaner based on the output voltage and a predetermined second threshold voltage, wherein the second threshold voltage is higher than the first threshold voltage.

The processor may be configured to switch the travel direction of the robot cleaner to a direction different from a previous travel direction when the output voltage is lower than the first threshold voltage, and control the travel direction of the robot cleaner to maintain the same direction as the previous travel direction when the output voltage is equal to or higher than the first threshold voltage.

The processor may be configured to control the robot cleaner to operate in a first suction mode when the output voltage is equal to or higher than the first threshold voltage and is less than the second threshold voltage, and control the robot cleaner to operate in a second suction mode having a relatively lower suction force than that of the first suction mode when the output voltage is equal to or higher than the second threshold voltage.

The infrared sensor may include a plurality of infrared sensors, and the processor may be configured to control the robot cleaner to operate in a first suction mode when all output voltages of a plurality of electrical signals respectively received from the plurality of infrared sensors are equal to or higher than the first threshold voltage and are less than the second threshold voltage, and control the robot cleaner to operate in a second suction mode when at least one or more of the output voltages of the plurality of electrical signals is equal to or higher than the second threshold voltage.

The infrared sensor may include a plurality of infrared sensors, and the processor may be configured to control the robot cleaner to operate in a first suction mode when at least one of output voltages of a plurality of electrical signals respectively received from the plurality of infrared sensors is equal to or higher than the first threshold voltage and are less than the second threshold voltage, and control the robot cleaner to operate in a second suction mode when all the output voltages of the plurality of electrical signals are equal to or higher than the second threshold voltage.

The processor may be configured to calculate an average output voltage of a plurality of electrical signals received for a predetermined time from the infrared sensor and control the travel direction and the suction mode of the robot cleaner using the calculated average output voltage.

The second threshold voltage may be an average voltage of an output voltage of the infrared ray reflected from a hard floor and an output voltage of the infrared ray reflected from a soft floor.

The processor may be configured to determine output voltages of first and second electrical signals respectively with respect to infrared rays reflected from first and second floors and change the second threshold voltage to correspond to an average voltage of the output voltages of the first and second electrical signals.

According to another aspect of the present disclosure, a control method of a robot cleaner may include outputting an infrared ray to a floor; receiving the infrared ray reflected from the floor and converting the received infrared ray into an electric signal; and determining an output voltage of the electrical signal, controlling a travel direction of the robot cleaner based on the output voltage and a predetermined first threshold voltage, and controlling a suction mode of the robot cleaner based on the output voltage and a predetermined second threshold voltage, wherein the second threshold voltage is higher than the first threshold voltage.

The controlling may include switching the travel direction of the robot cleaner to a direction different from a previous travel direction when the output voltage is equal to or lower than the first threshold voltage, and controlling the travel direction of the robot cleaner to maintain the same direction as the previous travel direction when the output voltage is equal to or higher than the first threshold voltage.

The controlling may include controlling the robot cleaner to operate in a first suction mode when the output voltage is equal to or higher than the first threshold voltage and is less than the second threshold voltage, and controlling the robot cleaner to operate in a second suction mode having a relatively lower suction force than that of the first suction mode when the output voltage is equal to or higher than the second threshold voltage.

The infrared sensor controlling may include a plurality of infrared sensors, and the controlling may include controlling the robot cleaner to operate in a first suction mode when all output voltages of a plurality of electrical signals respectively received from the plurality of infrared sensors are equal to or higher than the first threshold voltage and are less than the second threshold voltage, and controlling the robot cleaner to operate in a second suction mode when at least one or more of the output voltages of the plurality of electrical signals is equal to or higher than the second threshold voltage.

The infrared sensor may include a plurality of infrared sensors, and the controlling may include controlling the robot cleaner to operate in a first suction mode when at least one of output voltages of a plurality of electrical signals respectively received from the plurality of infrared sensors is equal to or higher than the first threshold voltage and are less than the second threshold voltage, and controlling the robot cleaner to operate in a second suction mode when all the output voltages of the plurality of electrical signals are equal to or higher than the second threshold voltage.

The controlling may include calculating an average output voltage of a plurality of electrical signals received for a predetermined time from the infrared sensor and using the calculated average output voltage.

The second threshold voltage may be an average voltage of an output voltage of the infrared ray reflected from a hard floor and an output voltage of the infrared ray reflected from a soft floor.

The control method may further include: determining output voltages of first and second electrical signals respectively with respect to infrared rays reflected from first and second floors and changing the second threshold voltage to correspond to an average voltage of the output voltages of the first and second electrical signals.

As set forth above, according to the diverse exemplary embodiments of the present disclosure, a suction mode of the robot cleaner may be controlled by using an infrared sensor for changing a direction of the robot cleaner, thereby improving the cleaning efficiency of the robot cleaner without an increase in the material cost and increasing the battery efficiency of the robot cleaner.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWING

For a more complete understanding of the present disclosure and its advantages, reference is now made to the following description taken in conjunction with the accompanying drawings, in which like reference numerals represent like parts.

DETAILED DESCRIPTION

Figure 1:
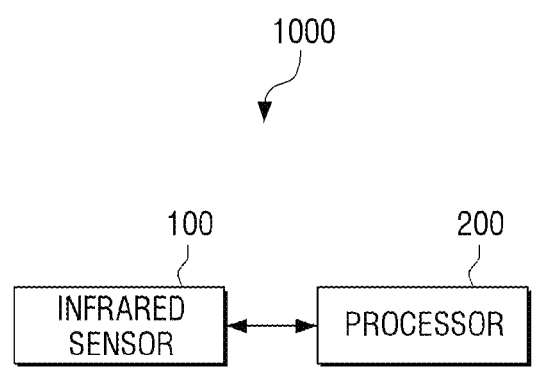
FIG. 1 illustrates a block diagram for explaining a robot cleaner according to an exemplary embodiment of the present disclosure.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Since the present disclosure may be variously modified and have several exemplary embodiments, specific exemplary embodiments of the present disclosure will be illustrated in the drawings and be described in detail in the detailed description. However, it is to be understood that the present disclosure is not limited to specific exemplary embodiments, but includes all modifications, equivalents, and substitutions without departing from the scope and spirit of the present disclosure. When it is decided that a detailed description for the known art related to the present disclosure may obscure the gist of the present disclosure, the detailed description will be omitted.

Terms 'first', 'second', and the like, may be used to describe various components, but the components are not to be construed as being limited by the terms. The terms are used only to distinguish one component from another component.

Terms used in the present disclosure are used only to describe specific exemplary embodiments rather than limiting the scope of the present disclosure. Singular forms are intended to include plural forms unless the context clearly indicates otherwise. It will be further understood that terms "include" or "formed of" used in the present specification specify the presence of features, numerals, steps, operations, components, parts, or combinations thereof mentioned in the present specification, but do not preclude the presence or addition of one or more other features, numerals, steps, operations, components, parts, or combinations thereof.

In exemplary embodiments, a 'module' or an '~er/or' may perform at least one function or operation, and be implemented by hardware or software or be implemented by a combination of hardware and software. In addition, a plurality of 'modules' or a plurality of '~ers/ors' may be integrated in at least one module and be implemented by at least one processor (not illustrated) except for a 'module' or an '~er/or' that needs to be implemented by specific hardware.

Hereinafter, the present disclosure will be described in detail with reference to the accompanying drawings.

FIG. 1 illustrates a block diagram for explaining a robot cleaner 1000 according to an exemplary embodiment of the present disclosure.

The robot cleaner 1000 refers to a device that is driven to suck impurities such as dust on a floor. As shown in FIG. 1, the robot cleaner 1000 may include an infrared sensor 100 and a processor 200.

First, the infrared sensor 100 may include a light emitting device that outputs an infrared ray and a light receiving device that receives the infrared ray and converts the infrared ray into an electric signal. To this end, the light emitting device may include an infrared diode (IR) that converts the electrical signal into the infrared ray and outputs the infrared ray, and the light receiving device may include a photo transistor that receives the infrared ray, converts the received infrared ray into the electric signal, and outputs the electrical signal. However, this is merely an exemplary embodiment and it should be understood that the infrared sensor may be any of various types of semiconductors capable of performing the function described above.

Here, the light emitting device of the infrared sensor 100 may output the infrared ray to the floor, and the light receiving device may receive the infrared ray reflected from the floor.

To this end, the infrared sensor 100 may be configured as a module in which the light emitting device and the light receiving device face each other at a specific angle.

Specifically, the light emitting device and the light receiving device of the infrared sensor 100 may be arranged at a predetermined distance horizontally at a lower end of the robot cleaner 1000, and the light emitting device of the infrared sensor 100 may be arranged at a specific angle, for example, 60 degrees in a travel direction of the robot cleaner 1000 with respect to a vertical line, and the light receiving device may be disposed at a specific angle, for example, 45 degrees in a direction of the light emitting device with respect to the vertical line.

The floor may be various kinds of floors located on a lower side of the robot cleaner 1000 in operation. For example, the floor may be a flooring of wood and marble, etc., as well as various types of carpets such as a carpet on the flooring, such as a nylon carpet, a polypropylene carpet, a wool carpet, etc.

Meanwhile, although the robot cleaner 1000 has been described as using the infrared sensor 100, this is merely an exemplary embodiment and it should be understood that various types of sensors such as an ultrasonic sensor and a laser sensor may be used.

The processor 200 may control an overall operation of the robot cleaner 1000. To this end, the processor 200 may include a central processing unit (CPU), a random access memory (RAM), and a read only memory (ROM) to perform operations or data processing related to other components included in the robot cleaner 1000.

First, the processor 200 may determine an output voltage of an electrical signal if the electrical signal is received from the infrared sensor 100.

Specifically, the processor 200 may determine the output voltage of the electrical signal based on a voltage between both ends of the light receiving device that receives the infrared ray. To this end, a voltage measurer (not shown) for measuring the voltage may be further included at both ends of the light receiving device. However, this is merely an exemplary embodiment, and the processor 200 may determine the output voltage of the electrical signal by using various methods. For example, the robot cleaner 1000 may further include an UV converter capable of converting the electrical signal output from the light receiving device into a voltage signal, and accordingly, the processor 200 may determine the output voltage of the robot cleaner 1000 based on the converted voltage signal.

The processor 200 may control the travel direction and the suction mode of the robot cleaner 1000 based on the output voltage of the electric signal received from the infrared sensor 100 and a predetermined voltage.

Specifically, the processor 200 may control the travel direction of the robot cleaner 1000 based on the output voltage of the electrical signal and a predetermined first threshold voltage and control the suction mode of the robot cleaner 1000 based on the output voltage of the electrical signal and a predetermined second threshold voltage. Hereinafter, this will be described in detailed with reference to FIG. 2.

Figure 2:
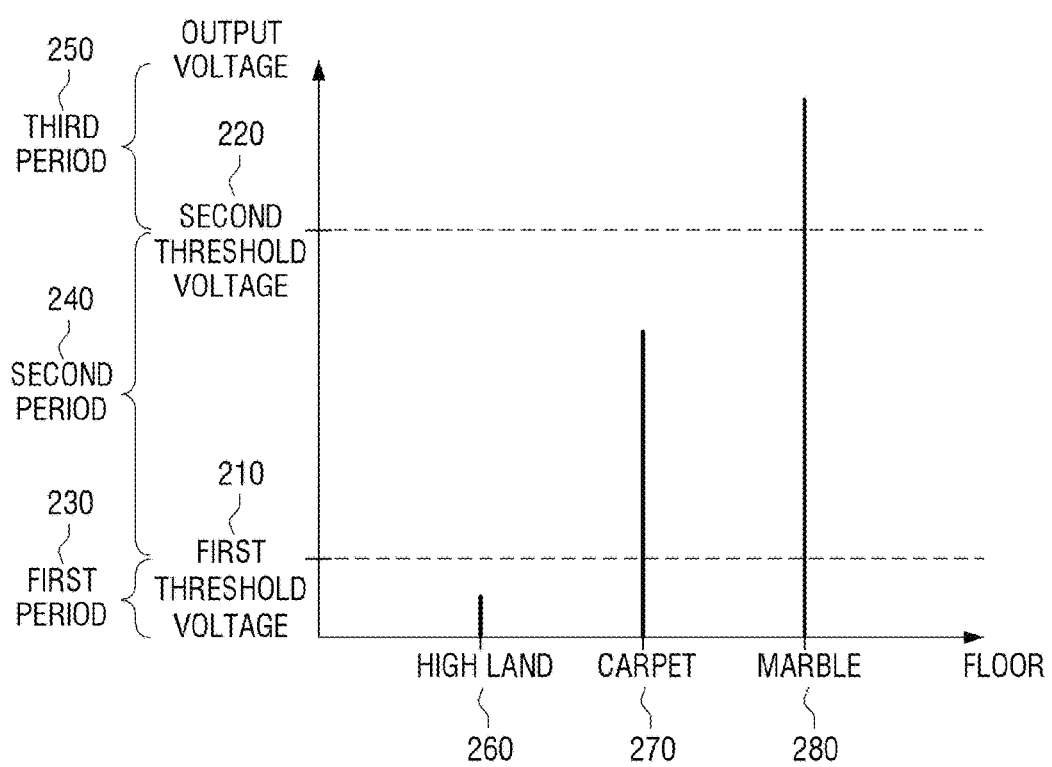
FIG. 2 illustrates a diagram for explaining a method of controlling a travel direction and a suction mode of a robot cleaner according to an exemplary embodiment of the present disclosure.

FIG. 2 illustrates a diagram for explaining a method of controlling a travel direction and a suction mode of the robot cleaner 1000 according to an exemplary embodiment of the present disclosure.

As shown in FIG. 2, a first period and a second period may divided based on a first threshold voltage, and the second period and a third period may be divided based on a second threshold voltage.

Here, the first threshold voltage may be a reference voltage for determining the travel direction of the robot cleaner 1000.

Specifically, when the robot cleaner 1000 moves from a cliff or a high land to a low land, since a distance between the infrared sensor 100 and the floor becomes far, an amount of reflected infrared ray may be relatively small as compared with a case where the robot cleaner 1000 moves on a flat land. Accordingly, an output voltage proportional to the amount of infrared ray is also relatively small. At this time, if the output voltage falls below a specific voltage, since it means that the robot cleaner 1000 moves from the cliff or the high land to the low land, the travel direction of the robot cleaner 1000 needs to be changed. As described above, the specific voltage set for preventing the robot cleaner 1000 from falling may be the first threshold voltage. For example, when the distance between the infrared sensor 100 and the floor is about 20 mm with respect to a black bottom having a lowest reflectance, the first threshold voltage may be about 12 mV. However, this is merely an exemplary embodiment and it should be understood that the first threshold voltage may be several mV to several tens mV according to the distance between the infrared sensor 100 and the floor and the reflectance of a bottom material.

Accordingly, if it is determined that the output voltage of the robot cleaner 1000 is equal to or less than the first threshold voltage, the processor 200 may change the travel direction of the robot cleaner 1000.

Specifically, referring to FIG. 2, when the processor 200 determines that the output voltage of the robot cleaner 1000 belongs to the first period that is less than the first threshold voltage, the processor 200 may switch the travel direction of the robot cleaner 1000 to a direction different from a previous travel direction.

When the processor 200 determines that the output voltage of the robot cleaner 1000 belongs to the second period or the third period that is equal to or greater than the first threshold voltage, the processor 200 may control the travel direction of the robot cleaner 1000 to be maintained equal to the previous travel direction.

The second threshold voltage may be the reference voltage for determining the suction mode of the robot cleaner 1000.

Specifically, according to a material characteristic, a soft floor such as a carpet, etc. has a relatively larger amount of impurities such as dust than a hard floor such as a marble.

Accordingly, when the robot cleaner 1000 operates on the soft floor than operating on the hard floor, the robot cleaner 1000 may more effectively suck impurities by having to drive a suction motor at a relatively high suction force.

According to the material characteristic, when the robot cleaner 1000 moves on the soft floor, an amount of infrared ray reflected from the floor may be smaller than an amount of infrared ray reflected from the floor when the robot cleaner 1000 moves on the hard floor. Also, since the output voltage is proportional to the amount of infrared ray, the output voltage on the soft floor may be lower than the output voltage on the hard floor.

Therefore, in the present disclosure, when the robot cleaner 1000 is in each of the hard floor and the soft floor, the processor 200 measures an output voltage of infrared ray reflected from each floor and set an average voltage of the measured output voltages as the second threshold voltage. For example, when the output voltage of infrared ray reflected from the hard floor of marble or the like is 2.64V and the output voltage of infrared ray reflected from the soft floor of the carpet, etc. is 1.54V, the second threshold voltage may be set to about 2.1V that is an average thereof. That is, the second threshold voltage may be set to a value between the output voltage of infrared ray reflected from the hard floor and the output voltage of infrared ray reflected from the soft floor.

The processor 200 may change the suction mode of the robot cleaner 1000 based on the second threshold voltage.

Specifically, referring to FIG. 2, when the processor 200 determines that the output voltage of the robot cleaner 1000 belongs to the second period in which the output voltage is equal to or higher than the first threshold voltage and lower than the second threshold voltage, the processor 200 may control the robot cleaner 1000 to operate in a first suction mode, and when the processor 200 determines that output voltage of the robot cleaner 1000 belongs to the third period in which the output voltage is equal to or higher than the second threshold voltage, the processor 200 may control the robot cleaner 1000 to operate in a second suction mode having a relatively lower suction force than the first suction mode.

As described above, the robot cleaner 1000 according to an exemplary embodiment of the present disclosure may control not only the travel direction of the robot cleaner 1000 but also the suction mode based on the output voltage of infrared ray reflected from the floor, thereby efficiently managing battery of the robot cleaner 1000 and providing a cleaning service that further meets user needs.

Meanwhile, the infrared sensor 100 may include a plurality of infrared sensors. Specifically, the robot cleaner 1000 may include a plurality of infrared sensor modules including a light emitting device and a light receiving device.

Figure 3:
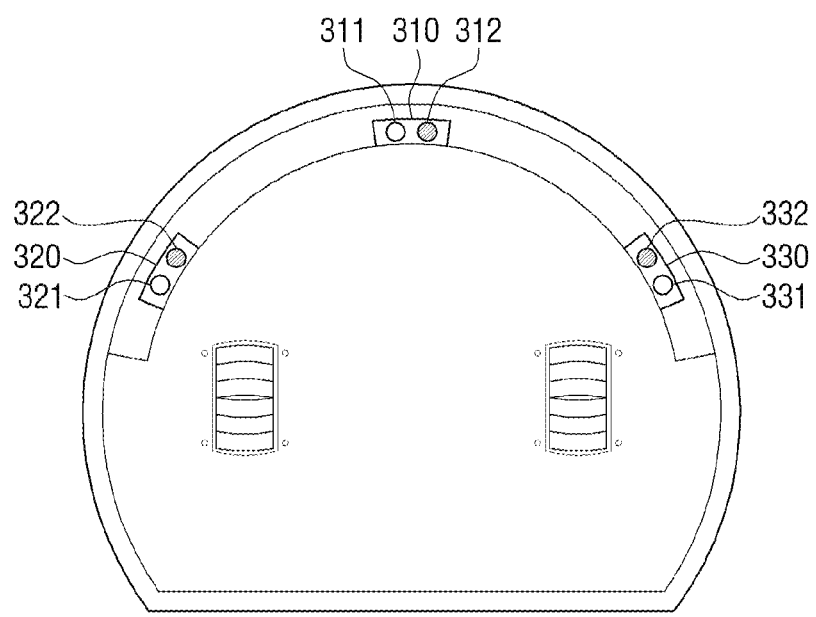
FIG. 3 illustrates a diagram for explaining a plurality of infrared sensors included in a robot cleaner according to an exemplary embodiment of the present disclosure.

For example, referring to FIG. 3, the robot cleaner 1000 may include a main infrared sensor 310 located at a lower center of the robot cleaner 1000 and side infrared sensors 320 and 330 located at both sides thereof. However, this is merely an exemplary embodiment and it should be understood that the number of infrared sensors may be changed as needed.

The processor 200 may control the suction mode of the robot cleaner 1000 based on the plurality of infrared sensors.

Specifically, when all output voltages of a plurality of electrical signals received from the plurality of infrared sensors respectively are equal to or higher than the first threshold voltage and o lower than the second threshold voltage, the processor 200 may control the robot cleaner 1000 to operate in the first suction mode and when at least one or more of the output voltages of the plurality of electrical signals is equal to or greater than the second threshold voltage, the processor 200 may control the robot cleaner 1000 to operate in the second suction mode.

That is, when all the output voltages of the plurality of electrical signals are equal to or higher than the first threshold voltage and lower than the second threshold voltage, the processor 200 may control the robot cleaner 1000 to operate in the first suction mode in that the entire robot cleaner 1000 may be regarded as being located in the soft floor.

However, when at least one or more of the output voltages of the plurality of electrical signals is equal to or higher than the second threshold voltage, at least a part of the robot cleaner 1000 may be regarded as being located in the hard floor. Accordingly, in such a case, the processor 200 controls the robot cleaner 1000 to operate in the second suction mode having a relatively lower suction force than the first suction mode.

Accordingly, a problem that battery is unnecessarily consumed may be prevented.

The processor 200 may control the robot cleaner 1000 to operate in the first suction mode when at least one or more of the output voltages of the plurality of electrical signals received from the plurality of infrared sensors respectively is equal to or higher than the first threshold voltage and lower than the second threshold voltage and control the robot cleaner 1000 to operate in the second suction mode when all the output voltages of the plurality of electrical signals are equal to or higher than the second threshold voltage.

Accordingly, a user may efficiently utilize the robot cleaner 1000 in consideration of an area occupied by an in-home soft floor, for example, the carpet.

Meanwhile, the processor 200 may calculate an average output voltage of a plurality of electrical signals received for a predetermined time from the infrared sensor 100 and control the travel direction and the suction mode of the robot cleaner 1000 using the calculated average output voltage.

Specifically, the processor 200 may receive the plurality of electrical signals from the infrared sensor 100 for the predetermined time. The processor 200 may calculate the average output voltage of the output voltages of the plurality of received electrical signals, change the travel direction of the robot cleaner 1000 when it is determined that the calculated average output voltage is less than the first threshold voltage, and maintain the travel direction of the robot cleaner 1000 when it is determined that the calculated average output voltage is equal to or higher than the first threshold voltage.

Similarly, when the calculated average output voltage is equal to or higher than the first threshold voltage and less than the second threshold voltage, the processor 200 may control the robot cleaner 1000 to operate in the first suction mode, and when the calculated average output voltage is equal to or higher than the second threshold voltage, the processor 200 may control the robot cleaner 1000 to operate in the second suction mode.

Accordingly, it is possible to prevent the robot cleaner 1000 from malfunctioning when an irregular electrical signal is received due to an influence of impurities or the like existing on the floor. For example, when the robot cleaner 1000 is controlled with respect to an instantaneous output voltage, even though the robot cleaner 1000 is present on the hard floor, although the robot cleaner 1000 may output the same output voltage as the output voltage in the soft floor due to an influence of impurities or the like existing on the hard floor and operate in the first suction mode, the robot cleaner 1000 may be controlled with respect to the average output voltage, thereby preventing such a malfunction.

The processor 200 may determine output voltages of first and second electrical signals with respect to infrared rays respectively reflected from first and second floors and change the second threshold voltage to correspond to an average voltage of the output voltages of the first and second electrical signals.

To this end, the robot cleaner 1000 may further include an interface 420 for changing the second threshold voltage and a display 410 for displaying a UI screen.

Figure 4:
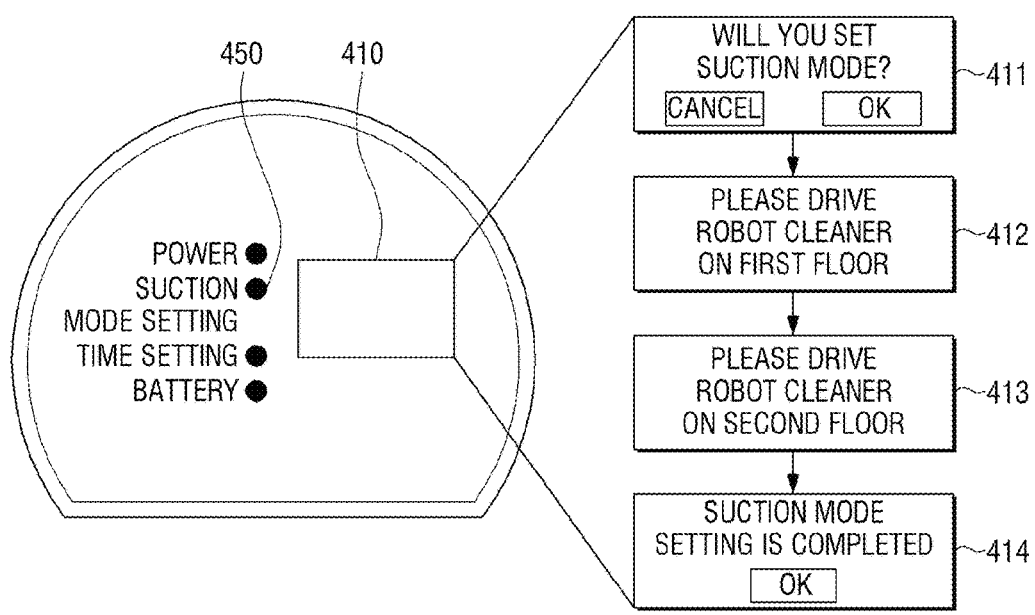
FIG. 4 illustrates a diagram for explaining a method of changing a predetermined second threshold voltage of a robot cleaner according to an exemplary embodiment of the present disclosure.

For example, referring to FIG. 4, if the user selects the interface 420 for changing the second threshold voltage, the robot cleaner 1000 may display a UI screen 411 regarding whether to reset the suction mode for changing the second threshold voltage.

If the user selects 'OK' on the UI screen 411, the display 410 may display a UI screen 412 requesting driving of the robot cleaner 1000 on the first floor. At this time, when the user drives the robot cleaner 1000 on the first floor, the processor 200 may control the infrared sensor to output infrared ray to the floor and to receive the reflected infrared ray. Then, the processor 200 may determine a first output voltage based on an amount of reflected infrared ray. Then, the display may display a UI screen 413 requesting driving of the robot cleaner 1000 on the second floor. At this time, when the user drives the robot cleaner 1000 on the second floor, the processor 200 may control the infrared sensor to output infrared ray on the floor and receive the reflected infrared ray. Then, the processor 200 may determine a second output voltage based on an amount of reflected infrared ray.

The processor 200 may change the second threshold voltage to correspond to an average voltage of the first output voltage and the second output voltage, and display a UI screen 414 indicating that the second threshold voltage was changed. Accordingly, the robot cleaner 1000 may control the suction mode of the robot cleaner 1000 based on the changed second threshold voltage and the output voltage.

As described above, the robot cleaner 1000 according to an exemplary embodiment of the present disclosure may change the second threshold voltage according to a user command input through the interface 420, and accordingly, the user may change the second threshold voltage according to a type of a flooring or a carpet present at home. At this time, the user may receive a personalized cleaning service according to an environment in his/her home in that the second threshold voltage is a voltage used for determining the suction mode.

Meanwhile, in FIG. 4, the interface 420 is shown as a separate button. However, this is merely an exemplary embodiment and the interface 420 may be provided in various types such as a type that is touched to the display 410.

Figure 5:
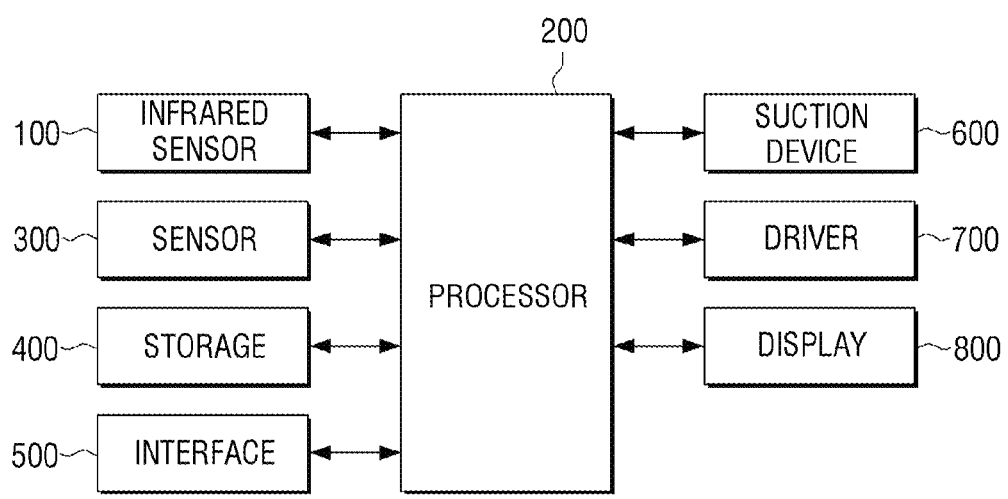
FIG. 5 illustrates a detailed block diagram for explaining a robot cleaner according to an exemplary embodiment of the present disclosure.

FIG. 5 illustrates a detailed block diagram for explaining the robot cleaner 1000 according to an exemplary embodiment of the present disclosure.

As shown in FIG. 5, the robot cleaner 1000 may include an infrared sensor 100, a sensor 300, a storage 400, an interface 500, a suction device 600, a driver 700, a display 800 and the processor 200. Hereinafter, redundant parts with those described above will be omitted.

The sensor 300 senses an obstacle around the robot cleaner 1000. Specifically, the sensor 300 may sense a position of the obstacle around the robot cleaner 1000 and a distance from the obstacle to the robot cleaner 1000 by using a supersonic sensor, an infrared sensor, an RF sensor, or the like. Also, the sensor 300 may further include a collision sensor that senses an obstacle through collision with the obstacle.

The sensor 300 senses an object located in front of the robot cleaner 1000. Specifically, the sensor 300 may include an imaging unit capable of imaging a front surface of the robot cleaner 1000, and may sense the object in an image imaged by the imaging unit through image processing. The sensor 300 may store a corresponding imaged image for an object requiring suction or detour in the storage 400.

The sensor 300 may sense a degree of dust on a floor surface. Specifically, the sensor 300 may include a dust sensor that senses the degree of dust in air entering the suction device 600. Accordingly, when the amount of dust detected in real time is reduced to a predetermined amount, the sensor 300 may determine that cleaning was performed well.

The sensor 300 senses whether the robot cleaner 1000 is in contact with liquid. Specifically, the sensor 300 may sense whether a wheel configuring the driver 700 of the robot cleaner 1000 is in contact with the liquid.

The storage 400 may store various programs and data necessary for an operation of the robot cleaner 1000. To this end, the storage 400 may be implemented as a nonvolatile memory, a volatile memory, a flash memory, a hard disk drive (HDD), or a solid state drive (SSD).

The storage 400 may store a first threshold voltage and a second threshold voltage. Here, the first threshold voltage may be a predetermined voltage to determine whether to change a travel direction of the robot cleaner 1000. The second threshold voltage may be a predetermined voltage to determine whether to change a suction mode of the robot cleaner 1000.

The storage 400 may store a history and the like generated during a cleaning process as history information. Here, the history information may include cleaning time, information about the number of times of charging, information about the number of times of occurrence of errors, information about each error, information about a non-cleaning region, and the like.

The interface 500 includes a plurality of function keys that a user may set or select various functions supported by the robot cleaner 1000. The interface 500 may be implemented as a device such as a plurality of buttons, or may be implemented as a touch screen capable of simultaneously performing a function of a display.

The interface 500 may receive an on/off command of a cleaning function of the robot cleaner 1000, a selection of a cleaning mode, a re-cleaning command for a non-cleaning region, a cleaning command for a specific space, etc. In particular, the interface 500 may receive a user command to change the second threshold voltage. Specifically, the interface 500 may receive first and second user commands for changing the second threshold voltage, and accordingly, the processor 200 may determine first and second output voltages based on an amount of infrared ray reflected from the floor and then change the second threshold voltage to correspond to an average voltage of the first output voltage and the second output voltage.

The suction device 600 sucks dust on the floor surface of the robot cleaner 1000. Specifically, the suction device 600 may perform a cleaning operation by absorbing impurities on a lower side during moving or stopping. The suction device 600 may further include an air purification unit that purifies contaminants in the air.

The suction device 600 has a plurality of operation modes. Here, the operation modes may be classified according to a suction strength.

For example, when the output voltage of the robot cleaner 1000 is equal to or higher than the first threshold voltage and lower than the second threshold voltage, the robot cleaner 1000 may operate in a first suction mode, and when the output voltage is equal to or higher than the second threshold voltage, the robot cleaner 1000 may operate in a second suction mode having a relatively higher suction force than that of the first suction mode.

The driver 700 moves the robot cleaner 1000. The driver 700 is connected to one or more wheels and includes a driver such as a motor. Then, the driver 700 performs a traveling operation such as moving, stopping, and turning of a direction according to a control signal of the processor 200.

The display 800 may display various types of information supported by the robot cleaner 1000. The display 800 may be a small-sized monitor such as an LCD or the like and may be implemented as a touch screen capable of simultaneously performing a function of an interface.

The display 800 may display information regarding an operation state of the robot cleaner 1000 (e.g., a cleaning mode or a sleep mode), information related to a cleaning progress (for example, cleaning progress time, a current cleaning mode (for example, a current suction mode)), battery information, whether or not a battery is charged, whether a dust container is full of dust, an error state (a liquid contact state), and the like. The display 800 may display a detected error if the error is detected.

The processor 200 performs control with respect to each configuration of the robot cleaner 1000.

Specifically, the processor 200 may start a cleaning operation according to a user command. At this time, the processor 200 may control the suction device 600 to operate in a suction mode corresponding to the output voltage based on the output voltage of the robot cleaner 1000.

For example, the processor 200 may control the driver 700 to switch the travel direction of the robot cleaner 1000 when the output voltage is lower than a first threshold voltage and may control the driver 700 to maintain the travel direction of the robot cleaner 1000 when the output voltage is equal to or higher than the first threshold voltage.

The processor 200 may control the suction device 600 to operate in a first suction mode of the robot cleaner 1000 when the output voltage is equal to or higher than the first threshold voltage and lower than the second threshold voltage, and may control the suction device 600 to operate in a second suction mode having a relatively lower suction force than that of the first suction mode.

Figure 6:
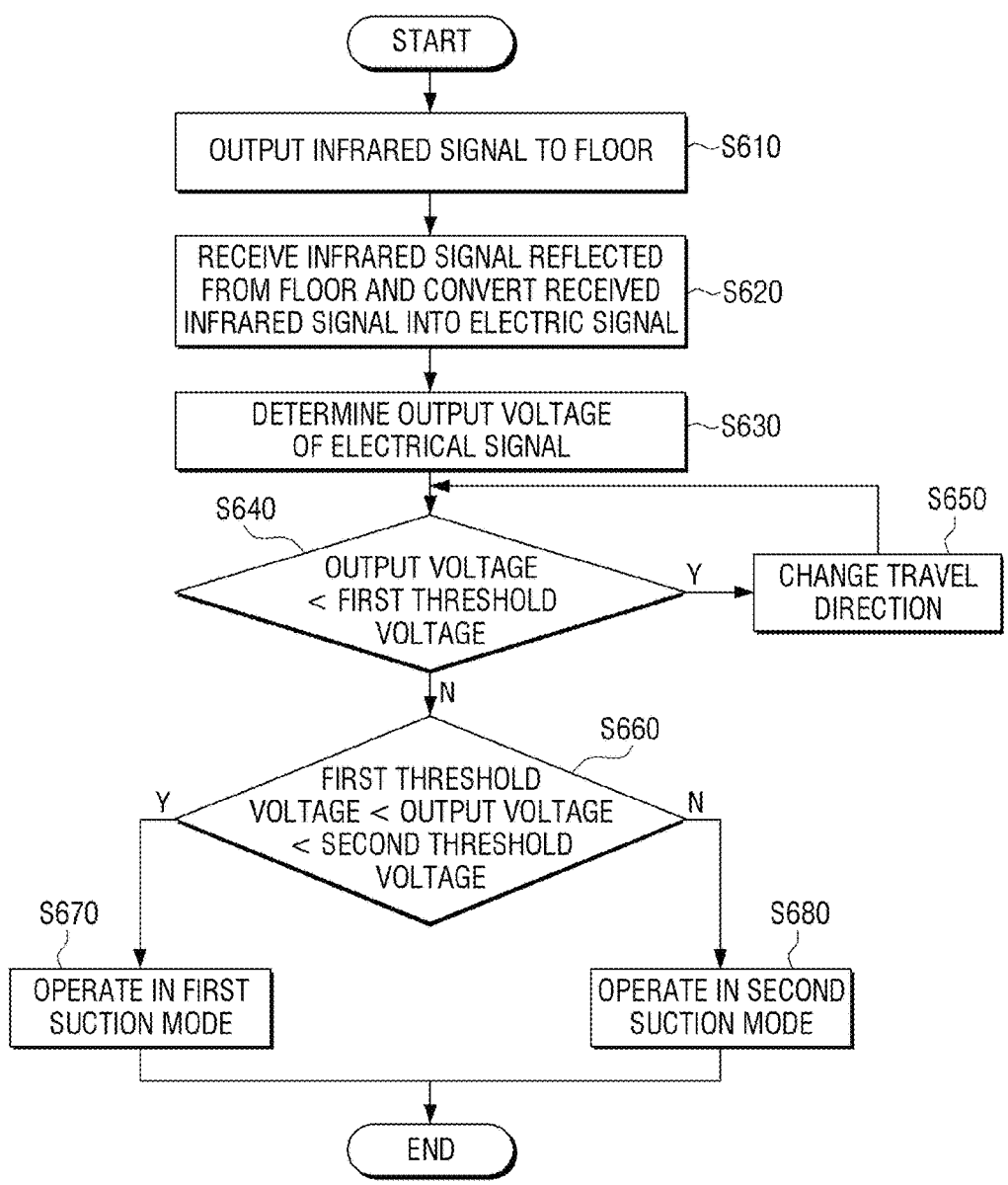
FIG. 6 illustrates a flowchart illustrating a control method of a robot cleaner according to an exemplary embodiment of the present disclosure.

FIG. 6 illustrates a flowchart illustrating a control method of the robot cleaner 1000 according to an exemplary embodiment of the present disclosure.

First, the robot cleaner 1000 may output infrared ray to a floor (S610). The robot cleaner 1000 may receive the infrared ray reflected from the floor and convert the received infrared ray into an electrical signal (S620), and determine an output voltage of the received electrical signal (S630). At this time, if the determined output voltage is less than a first threshold voltage, a travel direction of the robot cleaner 1000 may be changed (S650) to prevent falling, and if the output voltage is equal to or higher than the first threshold voltage, the travel direction of the robot cleaner 1000 may be maintained. The robot cleaner 1000 may determine whether the output voltage is equal to or higher than the first threshold voltage and less than the second threshold voltage (S660), if the determined output voltage is equal to or higher than the first threshold voltage and less than the second threshold voltage, the robot cleaner 1000 may operate in a first suction mode (S670) and if the determined output voltage is equal to or higher than the second threshold voltage, the robot cleaner 1000 may operate in a second suction mode having a relatively lower suction force than that of the first suction mode (S680).

As described above, the robot cleaner 1000 may control not only a travel direction but also a suction mode based on an output voltage of infrared ray reflected from a floor, thereby improving efficiency of cleaning and also removing unnecessary consumption of battery.

The control method of the robot cleaner according to the diverse exemplary embodiments described above may be implemented by a program and may be stored in a non-transitory computer-readable recording medium. Examples of the non-transitory computer-readable recording medium may be a compact disk (CD), a digital versatile disk (DVD), a hard disk, a Blu-ray disk, a universal serial bus (USB), a memory card, a read only memory (ROM), or the like.

The non-transitory computer-readable recording medium may be distributed over a networked computer system so that computer readable code may be stored and executed in a distributed manner. Also, functional programs, codes, and code segments for implementing the above method may be easily inferred by programmers skilled in the art to which the present disclosure pertains.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A robot cleaner comprising:
    an infrared sensor including a light emitting device configured to output an infrared ray to a floor and a light receiving device configured to receive the infrared ray reflected from the floor and convert the received infrared ray into an electric signal and output the electric signal; and
    a processor configured to determine an output voltage of the electrical signal if the electrical signal is received from the infrared sensor, control a travel direction of the robot cleaner based on the output voltage and a predetermined first threshold voltage, and control a suction mode of the robot cleaner based on the output voltage and a predetermined second threshold voltage, wherein the second threshold voltage is higher than the first threshold voltage.

2. The robot cleaner of claim 1, wherein the processor is further configured to switch the travel direction of the robot cleaner to a direction different from a previous travel direction when the output voltage is lower than the first threshold voltage, and control the travel direction of the robot cleaner to maintain the same direction as the previous travel direction when the output voltage is equal to or higher than the first threshold voltage.

3. The robot cleaner of claim 1, wherein the processor is further configured to control the robot cleaner to operate in a first suction mode when the output voltage is equal to or higher than the first threshold voltage and is less than the second threshold voltage, and control the robot cleaner to operate in a second suction mode having a relatively lower suction force than that of the first suction mode when the output voltage is equal to or higher than the second threshold voltage.

4. The robot cleaner of claim 1, wherein the infrared sensor includes a plurality of infrared sensors, and
    wherein the processor is further configured to control the robot cleaner to operate in a first suction mode when all output voltages of a plurality of electrical signals respectively received from the plurality of infrared sensors are equal to or higher than the first threshold voltage and are less than the second threshold voltage, and control the robot cleaner to operate in a second suction mode when at least one or more of the output voltages of the plurality of electrical signals is equal to or higher than the second threshold voltage.

5. The robot cleaner of claim 1, wherein the infrared sensor includes a plurality of infrared sensors, and
    wherein the processor is further configured to control the robot cleaner to operate in a first suction mode when at least one of output voltages of a plurality of electrical signals respectively received from the plurality of infrared sensors is equal to or higher than the first threshold voltage and is less than the second threshold voltage, and control the robot cleaner to operate in a second suction mode when all the output voltages of the plurality of electrical signals are equal to or higher than the second threshold voltage.

6. The robot cleaner of claim 1, wherein the processor is further configured to calculate an average output voltage of a plurality of electrical signals received for a predetermined time from the infrared sensor and control the travel direction and the suction mode of the robot cleaner using the calculated average output voltage.

7. The robot cleaner of claim 1, wherein the second threshold voltage is an average voltage of an output voltage of the infrared ray reflected from a hard floor and an output voltage of the infrared ray reflected from a soft floor.

8. The robot cleaner of claim 1, wherein the processor is further configured to determine output voltages of first and second electrical signals respectively with respect to infrared rays reflected from first and second floors and change the second threshold voltage to correspond to an average voltage of the output voltages of the first and second electrical signals.

9. The robot cleaner of claim 1, further comprising a display including a user interface configured to receive a plurality of commands.

10. The robot cleaner of claim 9, wherein the processor is further configured to determine the output voltage in response to a command received by the user interface.

11. A control method of a robot cleaner, the control method comprising:
    outputting an infrared ray to a floor;
    receiving the infrared ray reflected from the floor and converting the received infrared ray into an electric signal;
    determining an output voltage of the electrical signal;
    controlling a travel direction of the robot cleaner based on the output voltage and a predetermined first threshold voltage; and
    controlling a suction mode of the robot cleaner based on the output voltage and a predetermined second threshold voltage, wherein the second threshold voltage is higher than the first threshold voltage.

12. The control method of claim 11, wherein the controlling includes switching the travel direction of the robot cleaner to a direction different from a previous travel direction when the output voltage is lower than the first threshold voltage, and controlling the travel direction of the robot cleaner to maintain the same direction as the previous travel direction when the output voltage is equal to or higher than the first threshold voltage.

13. The control method of claim 11, wherein the controlling includes controlling the robot cleaner to operate in a first suction mode when the output voltage is equal to or higher than the first threshold voltage and is less than the second threshold voltage, and controlling the robot cleaner to operate in a second suction mode having a relatively lower suction force than that of the first suction mode when the output voltage is equal to or higher than the second threshold voltage.

14. The control method of claim 11, wherein the controlling includes controlling the robot cleaner to operate in a first suction mode when all output voltages of a plurality of electrical signals respectively received from a plurality of infrared sensors are equal to or higher than the first threshold voltage and are less than the second threshold voltage, and controlling the robot cleaner to operate in a second suction mode when at least one or more of the output voltages of the plurality of electrical signals is equal to or higher than the second threshold voltage.

15. The control method of claim 11, wherein the controlling includes controlling the robot cleaner to operate in a first suction mode when at least one of output voltages of a plurality of electrical signals respectively received from a plurality of infrared sensors is equal to or higher than the first threshold voltage and are less than the second threshold voltage, and controlling the robot cleaner to operate in a second suction mode when all the output voltages of the plurality of electrical signals are equal to or higher than the second threshold voltage.

16. The control method of claim 11, wherein the controlling includes calculating an average output voltage of a plurality of electrical signals received for a predetermined time from an infrared sensor and using the calculated average output voltage.

17. The control method of claim 11, wherein the second threshold voltage is an average voltage of an output voltage of the infrared ray reflected from a hard floor and an output voltage of the infrared ray reflected from a soft floor.

18. The control method of claim 11, further comprising:
determining output voltages of first and second electrical signals respectively with respect to infrared rays reflected from first and second floors; and
changing the second threshold voltage to correspond to an average voltage of the output voltages of the first and second electrical signals.

19. The control method of claim 11, further comprising receiving a command by a user interface.

20. The control method of claim 19, further comprising determining the output voltage in response to a command received by the user interface.

* * * * *